United States Patent [19]

Mizusawa et al.

[11] 4,285,909
[45] Aug. 25, 1981

[54] CATALYST ASSEMBLY FOR CLEANING AN EXHAUST GAS

[75] Inventors: Shinichiro Mizusawa, Okazaki; Hideaki Akamatsu, Toyota; Fumiyoshi Noda, Toyota; Yuji Watanabe, Toyota, all of Japan

[73] Assignee: Toyota Jidosha Kogyo Kabushiki Kaisha, Toyota, Japan

[21] Appl. No.: 160,630

[22] Filed: Jun. 18, 1980

Related U.S. Application Data

[63] Continuation of Ser. No. 834,815, Sep. 19, 1977, abandoned, which is a continuation of Ser. No. 360,039, May 14, 1973, abandoned.

[30] Foreign Application Priority Data

May 13, 1972 [JP] Japan .................. 47-47518

[51] Int. Cl.³ .................. B01J 8/02; F01N 3/28; F01N 7/14
[52] U.S. Cl. .................. 422/179; 422/180
[58] Field of Search ............... 834/815; 422/179, 180; 106/40 R, 63, 69, 75; 264/43, 44, 343, 345

[56] References Cited

U.S. PATENT DOCUMENTS

| | | | |
|---|---|---|---|
| 3,148,996 | 9/1964 | Vukasovich et al. | 106/87 |
| 3,150,988 | 9/1964 | Dess et al. | 106/41 |
| 3,211,534 | 10/1965 | Ridgway | 422/171 |
| 3,268,350 | 8/1966 | Grebe et al. | 106/75 |
| 3,284,209 | 11/1966 | Kelley | 426/549 |
| 3,330,675 | 7/1967 | Magder | 106/87 |
| 3,382,082 | 5/1968 | Eubanks et al. | 106/5 |
| 3,574,646 | 4/1971 | Wismer et al. | 106/41 |
| 3,959,865 | 6/1976 | Close et al. | 422/179 |
| 3,961,907 | 6/1976 | Close et al. | 422/179 |

FOREIGN PATENT DOCUMENTS

962180  7/1964  United Kingdom .

*Primary Examiner*—Bradley Garris
*Attorney, Agent, or Firm*—Brisebois & Kruger

[57] ABSTRACT

This invention relates to a catalyst assembly for cleaning an exhaust gas wherein the catalyst and the carrier therefor are secured inside a catalyst muffler by means of expandable ceramic material. This invention also provides a method for making such a catalyst assembly.

8 Claims, 5 Drawing Figures

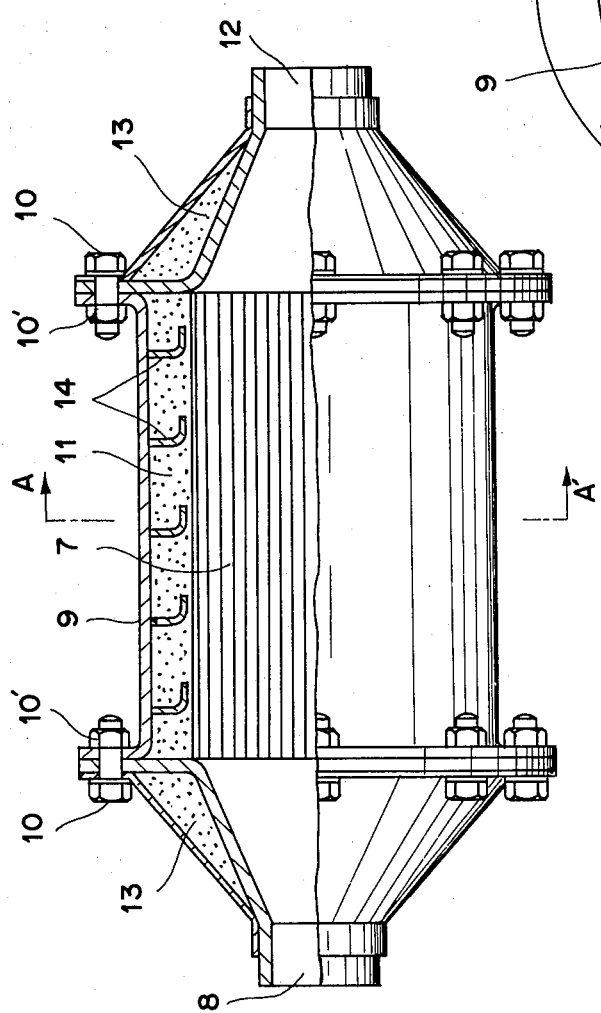
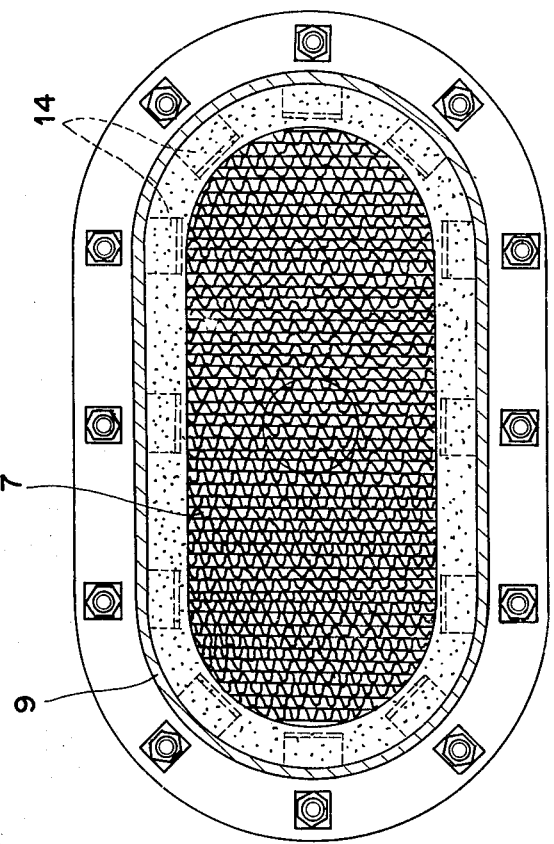

CATALYST ASSEMBLY FOR CLEANING AN EXHAUST GAS

This is a continuation, of application Ser. No. 834,815, filed Sept. 19, 1977, now abandoned which was a streamline continuation of Ser. No. 360,039, filed May 14, 1973, now abandoned.

BACKGROUND OF THE INVENTION

The conventional catalyst assembly for cleaning the exhaust gas of an automotive vehicle includes a catalyst or catalyst carrier (hereinafter referred to simply as the catalyst) having a honeycomb shape or a monolithic structure. This catalyst is secured inside the catalyst muffler by means of a mat or mats of ceramic fiber material or a resilient metal screen, both of which are mounted in the space between the catalyst and the catalyst muffler to serve as a cushioning material. Various arrangements are made to safeguard the catalyst muffler against destruction resulting from vibration and compensate for thermal expansion of the catalyst muffler.

However, the above process of providing mats of ceramic fiber around the catalyst has a defect in that the filling material is liable to contract as a consequence of vibration to form a gap between the filling material and the catalyst. The filling material then ceases to function effectively as a cushioning material. Moreover, when mats of ceramic fiber are used as filling material, a small quantity of exhaust gas flow unavoidably through the layers of filling material, thus causing particles of ceramic fiber to become entrained in the stream of exhaust gases and decreasing the effectiveness of the catalyst converter due to the flow of gas through the gap so formed.

On the other hand, when a resilient metal screen is coiled about the catalyst, the latter is subjected to a higher concentrated load under vibration at the points of contact with the metal screen, thus causing local cracks in the catalyst and shortening its service life. In addition, the catalyst used in the exhaust gas cleaner of the automotive vehicle is heated to a high temperature of 600° to 700° C. during usage, and the metal screen is also heated close to this temperature. This method is therefore disadvantageous economically as the metal screen must be fabricated from a material of higher quality to be used effectively as a cushioning material when subjected to these elevated temperatures.

SUMMARY OF THE INVENTION

This invention provides a catalyst assembly for cleaning the engine exhaust gas and a process for manufacturing the same. The catalyst assembly according to the present invention is so constructed that the space between the catalyst and the outer casing of the catalyst muffler is filled with a ceramic material having an internal compressive stress, which material is firmly bonded to both the catalyst and the outer casing. The ceramic material is safeguarded against deformation under the effect of vibration and the breakage or wear of the catalyst material resulting from thermal expansion and contraction thereof may thus be prevented. The expandable ceramic material provided by the present invention has excellent heat insulating characteristics so that the dissipation of heat and heat strain of the catalyst muffler can be substantially reduced.

BRIEF DESCRIPTION OF THE DRAWINGS

FIG. 4 is a side view of a second embodiment of the catalyst muffler, shown partly in section; and FIG. 5 is a transverse sectional view taken along line A—A' of FIG. 4.

DETAILED DESCRIPTION OF THE INVENTION

According to the present invention, the space between the catalyst and the outer casing of the catalyst muffler is filled with expandable ceramic material for supporting the catalyst. Suitable expandable ceramic materials include expandable ceramic powders of sodium silicate to which aggregates such as ceramic fiber powders have been added, "Shirasu balloons", pearlite and vermiculite. These expandable ceramic powders are introduced into the space between the catalyst and the outer casing of the catalyst muffler and expanded by heating. The quantity of expandable ceramic powders varies with the size of the space and the kind of ceramic material, but may preferably be in the range of 60 to 90 percent of the capacity of the above space. These powders are expanded by heating them from 200° to 400° C. to provide a support stratum.

According to the present invention, as described above, the space defined between the catalyst and the outer casing of the catalyst muffler is filled with a stratum of expanded ceramic material having an internal compressive stress, and this stratum can be given appropriate strength and resiliency depending on the expansion factor and the amount of the ceramic material introduced. Thus, the catalyst and the support stratum are firmly bonded together and are not subject to deformation under the effect of vibration. Moreover, there is no risk of breakage or wear of the catalyst as the stress generated through thermal expansion and contraction can be absorbed by the expanded ceramic material.

In addition, since the expandable ceramic powders used as the catalyst support stratum have excellent thermal insulating characteristics, dissipation of heat and thermal strain of the catalyst muffler can be substantially reduced, thus increasing the durability of the catalyst muffler. Furthermore, the outer casing of the catalyst can be manufactured from less expensive material, and also, the heat tolerance of the catalyst can be improved, and the heat of the catalyst converter can be transferred without difficulty to the body of the vehicle.

Since the majority of expandable ceramic powder particles used in the present invention are expanded into separate cells, the exhaust gases of the vehicle are substantially prevented from passing through the support stratum of expanded ceramic material. Even if the inlet section of the ceramic support stratum is partially destroyed, there is no risk of exhaust gas passing freely through the support stratum, and a higher performance of the catalyst converter can be assured.

EXAMPLE 1

Figure 1:
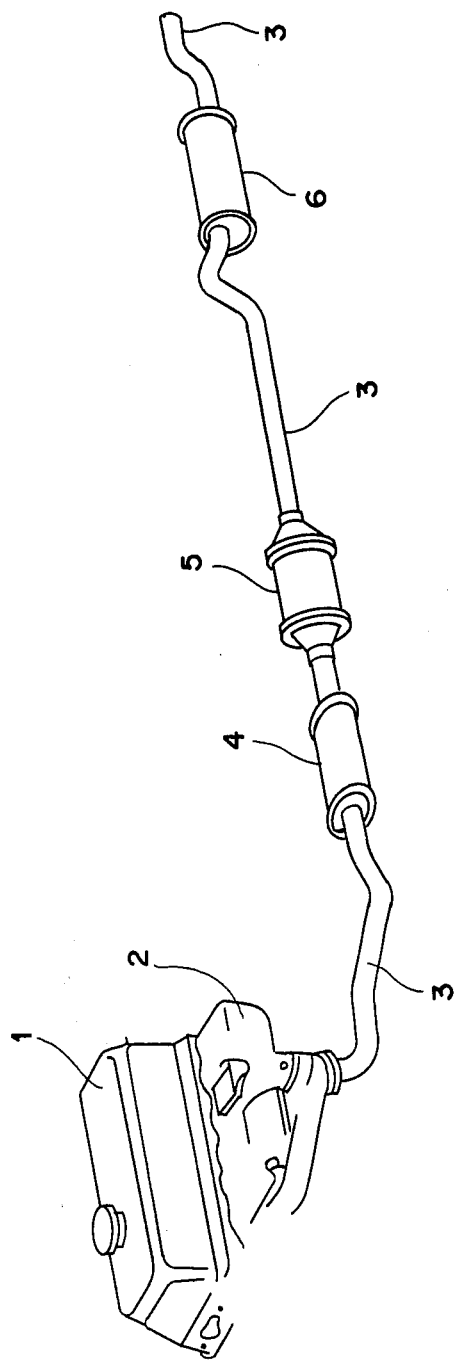
FIG. 1 is a diagrammatic perspective of an engine exhaust system.
Figure 3:
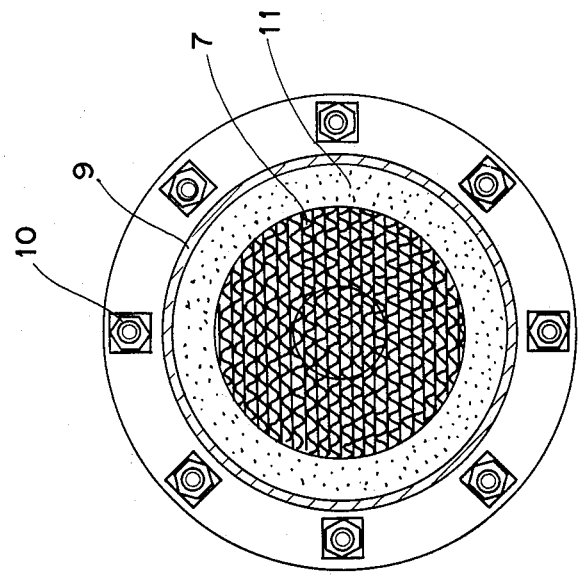
FIG. 3 is a transverse sectional view taken along line A—A' of FIG. 2.
Figure 2:
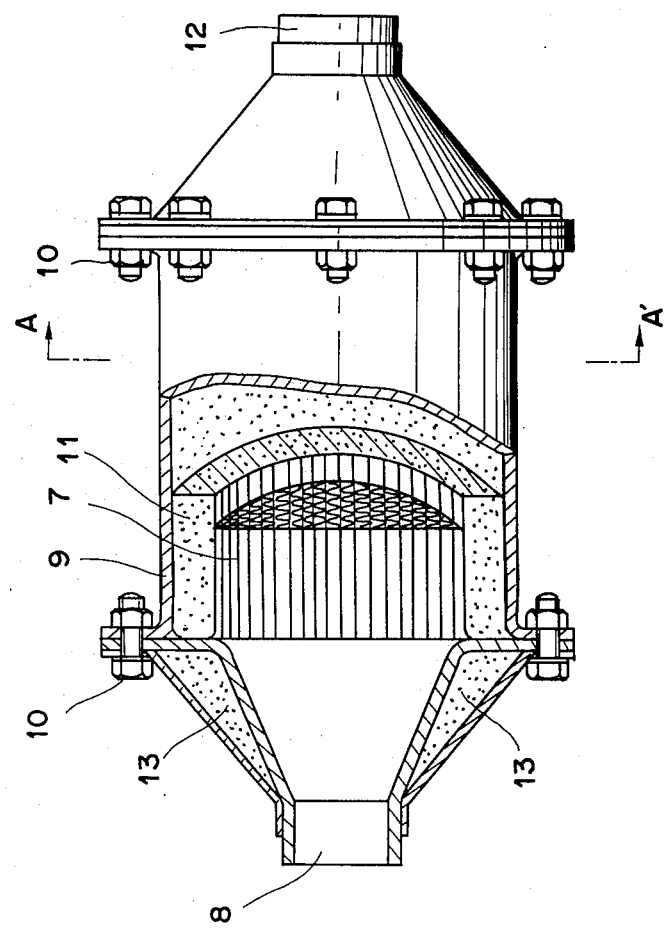
FIG. 2 is a side view of one embodiment of the catalyst muffler, shown partially in section.

Referring to the drawings, FIGS. 2 and 3 show one embodiment of a catalyst assembly according to the present invention and commonly referred to as a catalyst muffler or catalytic converter. FIG. 2 is a side view thereof, shown partially in section, and FIG. 3 a transverse sectional view thereof.

In the drawings, 7 denotes a cylindrical honeycomb type catalyst carrier, for which a commercially available product was used in the present example, alumina or alumina ceramic material.

In producing the catalyst assembly according to the present invention, an exhaust gas inlet section 8 on the left-hand side of the catalyst muffler as seen in FIG. 2 and the outer casing 9 are fastened together by bolt 10 and nut 10'. Then, the expandable ceramic powders of sodium silicate are introduced into the space indicated at 11 and intended to hold the catalyst support stratum so that about 75 percent of the capacity of this space is filled with the powdered material. Then, the exhaust gas outlet section shown at the right-hand side of the drawing is attached to the catalyst muffler by bolt 10 and nut 10'. The above operation is carried out with the left-hand side of the assembly directed downward and the right-hand side upward. After the expandable ceramic powder material has been introduced and the outlet section attached, the muffler is introduced in its entirety into an oven heated to 300° C. and kept there for 30 minutes to permit expansion of the powders so as to fill the space 11.

The process for producing the expandable ceramic powders will be explained below.

100g of sodium silicate (JIS-No. 3) and 20 g of aluminum hydroxide powder were supplied, with stirring, to a spray-drying unit to be dried and pulverized.

The drying temperature of the spray-drying unit was 120° to 140° C. and the supply rate was 60 g per minute. The unit utilized a rotary disc type nozzle and the nozzle was revolved at $10^4$ r.p.m. The sodium silicate powders produced in this way has a particle size of 0.1 to 1 mm and a water content of 23 percent.

This sodium silicate powder was mixed with ceramic fiber powder (average fiber diameter, 2.1 microns; average fiber length, 4.7 mm) in a volume ratio of 1:1 to obtain specimen powders.

The expandable ceramic powders thus obtained were introduced not only into the space 11 for the catalyst carrier, but also into the space 13 in the exhaust gas inlet section 8 and a corresponding space in the exhaust gas outlet section 12 for expansion so as to reduce the dissipation of heat from the catalyst muffler.

The catalyst muffler 5 in which the honeycomb type catalyst carrier 7 had been secured in the abovementioned manner, was connected to the exhaust manifold 2 of the engine 1 through an exhaust pipe 3 and sub-muffler 4. The catalyst muffler was mounted to an automotive vehicle with a main muffler 6 and an exhaust pipe 3 connected downstream thereof, and the vehicle was run a distance of 12,000 km under adverse road conditions as a durability test of the catalyst muffler.

After the test, the catalyst muffler was cut open and checked. There was no destruction of the catalyst carrier 7 or the support section 11.

EXAMPLE 2

100 g of sodium silicate powder (JIS-No. 3) and 25 g of magnesium hydroxide were supplied, with stirring, to a spray-drying unit to be dried and pulverized, in the same manner as in Example 1.

The spray-drying conditions were the same as in the preceding Example 1. The resulting powders had a particle size of 0.1 to 0.8 mm. These sodium silicate powders were mixed with ceramic fiber powders under the same conditions as in Example 1 to obtain specimen powders. These powders were then introduced into the space shown at 11 in FIGS. 2 and 3 in an amount equivalent to 85 percent of the capacity of that space. The catalyst muffler was then introduced into an oven maintained at 300° C. for permitting the expansion of the powders and thus producing a support stratum for the honeycomb type catalyst carrier. The expandable ceramic powders were also filled into the spaces 13 in the exhaust gas inlet section 8 and in the exhaust gas outlet section 12 and permitted to expand to produce a heat insulating stratum.

The catalyst muffler with the honeycomb-type catalyst carrier thus mounted thereto was mounted on an automotive vehicle. The vehicle was then run a distance of 7,500 km under adverse road conditions to carry out a durability test of the catalyst muffler. After the test, the catalyst muffler was cut open and inspected. No destruction of the catalyst muffler was found.

EXAMPLE 3

Sodium silicate powders obtained in the preceding Example 1 were mixed with "Shirasu balloons" in a volume ratio of 1:1. The mixture thus obtained was introduced into the space for the support stratum shown at 11 in FIGS. 2 and 3 in an amount equivalent to about 80 percent of the capacity of the space 11. The resulting assembly was introduced into an oven maintained at 300° C. and permitted to expand to produce a support stratum 11 for the honeycomb type catalyst carrier. The expandable ceramic powders were also introduced into the spaces 13 in the exhaust gas inlet section 8 and the exhaust gas outlet section 12 and permitted to expand to produce a heat insulating layer.

The catalyst muffler with the honeycomb type catalyst carrier 3 thus mounted therein was mounted on an automotive vehicle, and the latter was run a distance of 7,500 km under adverse road conditions as a durability test of the catalyst muffler. After the test, the catalyst muffler was cut open and inspected for defects. No defects were observed in the inspected muffler.

COMPARATIVE EXAMPLE 1

A mat of ceramic fiber material was wound about the honeycomb type catalyst carrier 7 and the assembly so formed was mounted in an automobile in the same way as in Example 1 and subjected to a durability test. The mat of ceramic fiber material was forcibly packed prior to the test, but after the durability test, which involved running the automotive vehicle a distance of 500 km under adverse road conditions, the ceramic fibers were found to be contracted and a gap was produced between the honeycomb type catalyst carrier and the support stratum 11. In addition, the catalyst carrier was broken at the left- and right-hand end sections.

EXAMPLE 4

A honeycomb type catalyst carrier 7 of an oval shape as shown in FIGS. 4 and 5 was secured to the catalyst muffler by means of a support stratum of expandable ceramic material in the same way as in Example 1. In the present Example, the ceramic layer and the outer casing 9 were more firmly bonded together by fins 14 projecting into the ceramic layer. The procedure used was otherwise the same as in Example 1. The catalyst converter was mounted on an automotive vehicle and the latter was run a distance of 15,000 km under adverse road conditions, but no defects such as breakage of the catalyst carrier or the support layer were encountered.

What is claimed is:

1. An assembly comprising in combination
   (a) an outer casing having gas inlet and gas outlet sections,
   (b) a honeycomb type catalyst unit mounted within said outer casing, the outer walls of said catalyst unit being located a spaced distance inwardly from the interior walls of said outer casing so as to form an annular space therebetween, said catalyst unit having passageways extending therethrough to accommodate the flow of engine exhaust gas into one end and out of the other,
   (c) a cured cellular ceramic mass completely filling said annular space between said casing and said catalyst unit, said cellular ceramic mass exerting both an outward force toward the interior walls of said casing and an inward force against the exterior walls of said catalyst unit by virtue of the fact that an uncured cellular ceramic mass was introduced into said annular space and then expanded in situ and cured in situ after introduction into said annular space.

2. An assembly according to claim 1 wherein said casing is in the form of a metal tube.

3. The assembly of claim 1 in which said cellular ceramic mass is a mixture of heat expanded sodium silicate powders and a constituent selected from the group consisting of "Shirasu balloons", perlite and vermiculite.

4. The assembly of claim 3 wherein said mixture is in a 1 to 1 ratio.

5. The assembly of claim 1 in which said cellular ceramic mass is a mixture comprising heat expanded sodium silicate powders and ceramic fiber powders.

6. The assembly of claim 5 wherein said mixture is in a 1 to 1 ratio.

7. The assembly of either claim 3 or 5 wherein said sodium silicate powders are also mixed with powders of a light metal hydroxide.

8. The assembly of claim 1 wherein said outer casing has a plurality of fins extending inwardly into said annular space.

* * * * *